(12) United States Patent
Gruber

(10) Patent No.: US 8,480,999 B2
(45) Date of Patent: Jul. 9, 2013

(54) METHOD FOR MANUFACTURING TITANIUM DIOXIDE

(71) Applicant: Rainer Gruber, Leverkusen (DE)

(72) Inventor: Rainer Gruber, Leverkusen (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 13/656,897

(22) Filed: Oct. 22, 2012

(65) Prior Publication Data

US 2013/0058860 A1  Mar. 7, 2013

Related U.S. Application Data

(63) Continuation of application No. 12/238,716, filed on Sep. 26, 2008, now Pat. No. 8,323,613.

(60) Provisional application No. 60/979,477, filed on Oct. 12, 2007.

(30) Foreign Application Priority Data

Oct. 12, 2007 (DE) .......................... 10 2007 049 297

(51) Int. Cl.
*C01G 23/07* (2006.01)

(52) U.S. Cl.
USPC .......................................... 423/613; 106/400

(58) Field of Classification Search
USPC .................................... 106/400; 423/610, 613
See application file for complete search history.

(56) References Cited

U.S. PATENT DOCUMENTS

| | | | |
|---|---|---|---|
| 3,615,202 A | 10/1971 | Stern et al. | |
| 6,387,347 B1 | 5/2002 | Deberry et al. | |
| 2007/0172414 A1 | 7/2007 | Subramanian et al. | |

FOREIGN PATENT DOCUMENTS

| | | |
|---|---|---|
| DE | 2225794 | 12/1973 |
| EP | 0427878 | 11/1989 |
| EP | 0583063 | 7/1993 |
| EP | 0852568 | 2/1998 |
| GB | 913151 | 12/1962 |
| GB | 969618 | 9/1964 |
| WO | WO 01/60748 | 8/2001 |
| WO | 2007/050682 | 5/2007 |
| WO | 2008/036534 | 3/2008 |

*Primary Examiner* — Pegah Parvini
(74) *Attorney, Agent, or Firm* — Locke Lord, LLP

(57) ABSTRACT

The manufacture of titanium dioxide by oxidation of titanium tetrachloride in a plug flow reactor, wherein the titanium tetrachloride is introduced into the reactor in at least two stages and is used exclusively in liquid form. The total quantity of liquid $TiCl_4$ used is split up in several stages. A small quantity is added in the first stage in order to start combustion despite using the liquid phase. In the first phase, the activation energy required is provided solely via the preheated oxygen. In all other stages, the activation energy is provided by the preheated oxygen and the reaction enthalpy of $TiCl_4$ oxidation released in the upstream stages.

20 Claims, 4 Drawing Sheets

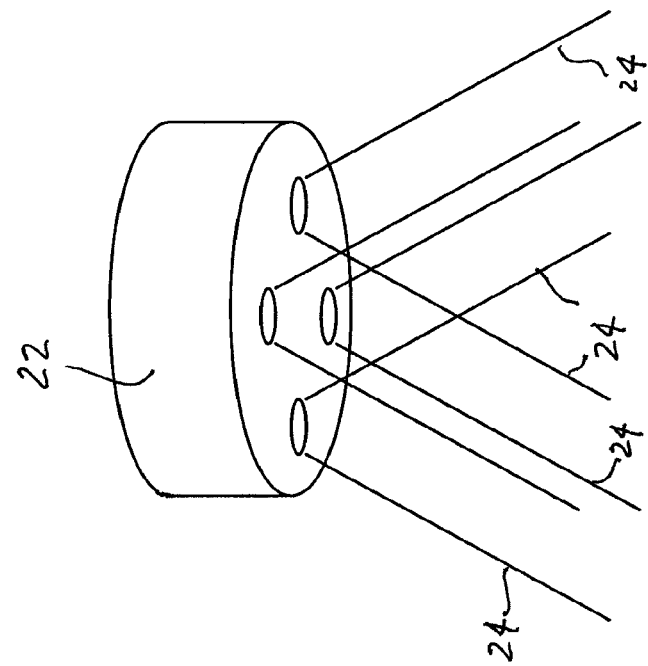
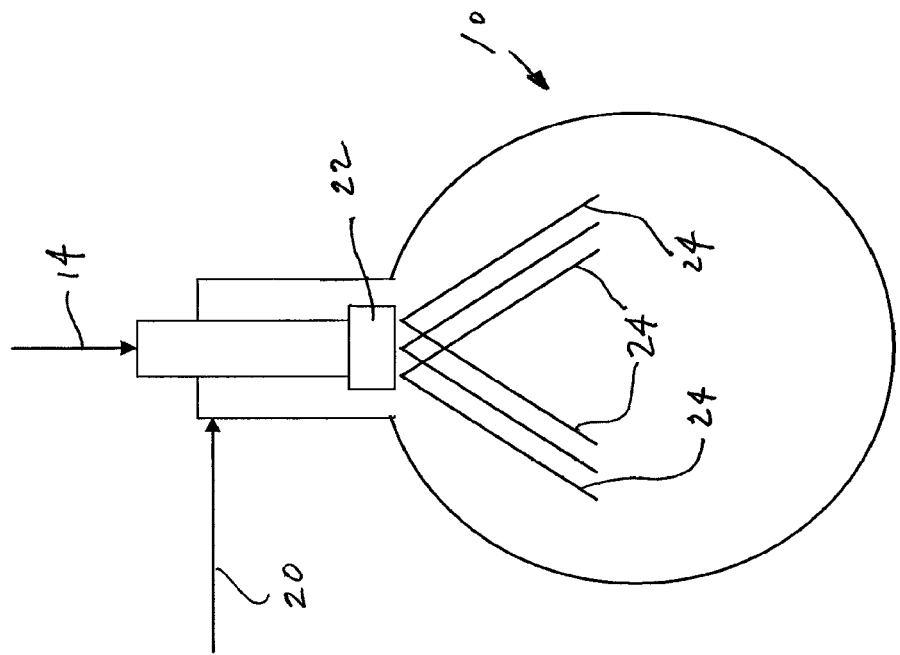

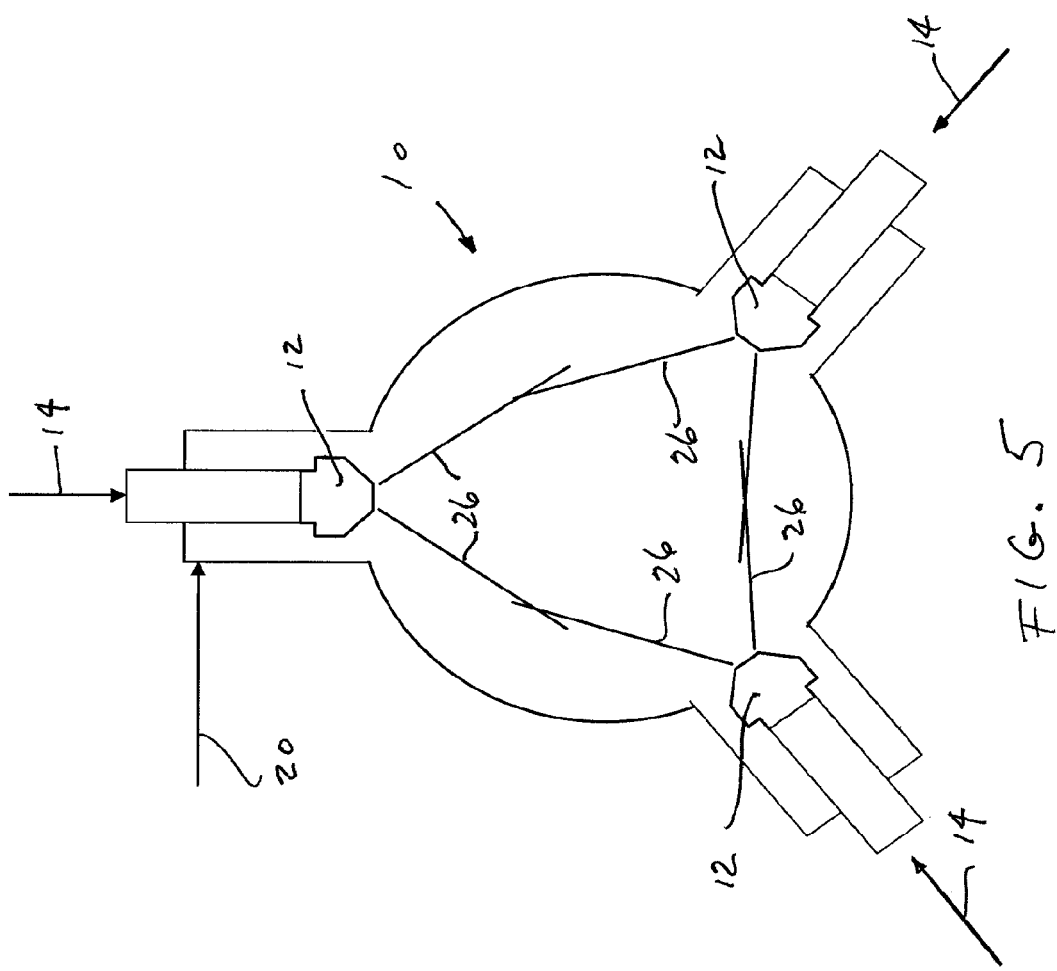

METHOD FOR MANUFACTURING TITANIUM DIOXIDE

RELATED APPLICATIONS

This application is a continuation of U.S. application Ser. No. 12/238,716 filed on Sep. 26, 2008 and further claims the benefit of U.S. Provisional Patent Application Ser. No. 60/979,477 filed Oct. 12, 2007, and entitled "Method for Making Titanium Dioxide" and the benefit of DE 102007049297.0-41 filed Oct. 12, 2007.

TECHNICAL FIELD

The invention relates to the manufacture of titanium dioxide by oxidation of titanium tetrachloride, where liquid titanium tetrachloride is used.

BACKGROUND

In one of the commercially used methods for manufacturing titanium dioxide pigment particles, known as the chloride process, titanium tetrachloride (TiCl4) is reacted with an oxidizing gas, such as oxygen, air, etc., and with certain additives in a plug flow reactor to form titanium dioxide and chlorine gas:

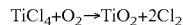

$$TiCl_4 + O_2 \rightarrow TiO_2 + 2Cl_2$$

The $TiO_2$ particles are subsequently separated from the chlorine gas. Known additives are $AlCl_3$ as a rutilizing agent and steam or alkali salts as a nucleating agent.

Owing to the high activation energy of $TiCl_4$ oxidation, the educts must be heated to such a degree that an adiabatic mixed temperature of the educts of approx. 800° C. is reached before the onset of the reaction so that the reaction takes place completely. The oxidation reaction is highly exothermal, meaning that, following complete, adiabatic conversion, the temperature of the product stream is roughly 900° C. higher than that of the educts. Before the $TiO_2$ particles are separated from the gaseous reaction products with the help of a filter, this mixture has to be substantially cooled in a cooling section in order to avoid damage to the filter.

According to U.S. Pat. No. 3,615,202, oxygen and $TiCl_4$ are preheated and subsequently caused to react in a plug flow reactor. Since the full quantities of the educts are in each case added at one point of the plug flow reactor, this can be referred to as a single-stage method. Similarly, EP 0 427 878 B1 discloses a single-stage method in which oxygen is heated to roughly 1,500° C. to 1,650° C. and mixed with $TiCl_4/AlCl_3$ vapour having a temperature of roughly 450° C. The process is energetically unsatisfactory in both cases because, referred to the 100% energy input for heating the educts, roughly 160% thermal reaction energy is subsequently released. Roughly 210% thermal energy then has to be dissipated from the hot product stream in the cooling section. The substantial reaction enthalpy is thus not used for activating the reaction, but transferred to the cooling-water system.

In the single-stage method according to GB 969,618 $TiCl_4$ is introduced co-axially and the hot oxygen containing gas is introduced tangentially into the reactor. The $TiCl_4$ is introduced in gaseous form, either alone or along with additional $TiCl_4$ in liquid form.

For the purpose of energetic optimization, EP 0 583 063 B1 describes two-stage introduction of $TiCl_4$ into the reactor. $TiCl_4$ with a temperature of at least 450° C. and mixed with $AlCl_3$ is fed into the hot oxygen stream at a first inlet point, and $TiCl_4$ with a temperature of 350° C. to 400° C. and without $AlCl_3$ at a further inlet point.

The method according to EP 0 852 568 B1 provides for not only the $TiCl_4$ to be added in two stages, but also the oxygen. However, the object of this method is effective control of the mean $TiO_2$ particle size, and thus of the tone of the $TiO_2$ pigment base material. In this case, $TiCl_4$ vapour having a temperature of roughly 400° C. is first fed into an oxygen stream with a temperature of roughly 950° C. The $TiO_2$ particles are formed, and particle growth takes place, in the downstream reaction zone. $TiCl_4$ vapour heated to a lesser extent (approx. 180° C.) is added at a second inlet point. Oxygen having a temperature between 25° C. and 1,040° C. is introduced at the second inlet point, the temperature of the mixture being sufficient to initiate the reaction.

The multi-stage method according to U.S. Pat. No. 6,387,347 is additionally said to reduce agglomeration. To this end, the previously heated $TiCl_4$ stream is split into two part streams before addition to the reactor. One part stream is oxidized in the first stage of the reactor. The second part stream is cooled by injection of liquid $TiCl_4$ (de-superheating) and then added to the reactor. De-superheating takes place outside the reactor, the temperature not falling below the condensation temperature of the overall stream.

US 2007/0172414 A1 discloses a multi-stage method in which gaseous $TiCl_4$ is fed into the reactor in the first stage, and liquid $TiCl_4$ in the second stage. This method permits energy savings and improvement of the particle size range.

SUMMARY OF THE INVENTION

The present invention for manufacturing titanium dioxide by oxidation of titanium tetrachloride permits further energy savings compared to the methods known from the prior art.

The present method for manufacturing titanium dioxide particles reacts titanium tetrachloride with an oxygen-containing gas in a plug flow reactor, wherein the titanium tetrachloride is introduced into the reactor in at least two stages and is used exclusively in liquid form.

BRIEF DESCRIPTION OF THE DRAWINGS

For a more complete understanding of the present invention and for further advantages thereof, reference is now made to the following description taken in conjunction with the accompanying drawings in which:

FIG. 3 is a diagrammatic illustration of a plug flow reactor having a hollow-core cluster head nozzle for use with the present method;

FIG. 4 is an enlarged view of the nozzle shown in FIG. 3;

FIG. 5 is a diagrammatic illustrative of a plug flow reactor having three single fluid nozzles, aligned radially to the circumference of the reactor and parallel to a plane lying perpendicular to the center line of the reactor for use with the present method.

DESCRIPTION OF THE PREFERRED EMBODIMENTS

Figure 2:
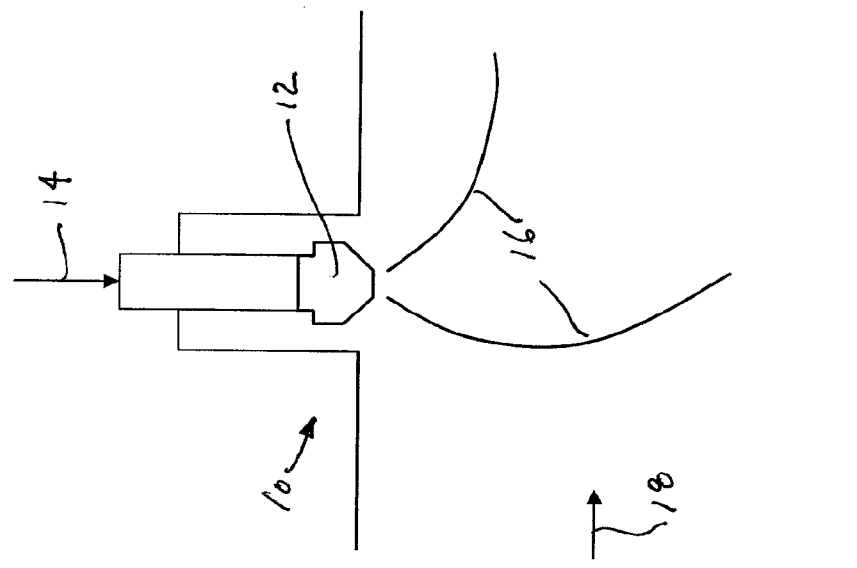
FIG. 2 is a side view of the reactor shown in FIG. 1.

The method according to the present invention differs from the aforementioned single-stage or multi-stage chloride processes for manufacturing titanium dioxide from the prior art in that the $TiCl_4$ is introduced into the oxidation reactor in at least two stages and exclusively in liquid form.

In this context, the total quantity of liquid $TiCl_4$ used is split up in several stages. A small quantity is added in the first stage in order to start combustion despite using the liquid phase. In the first phase, the activation energy required is provided solely via the preheated oxygen. In all other stages, the activation energy is provided by the preheated oxygen and the reaction enthalpy of $TiCl_4$ oxidation released in the upstream stages.

When developing the method, it is of central importance that the reaction not be extinguished as a result of injecting an excessive quantity of liquid $TiCl_4$ into one of the stages. An effective indication of whether the reaction will run spontaneously or die out is provided by the calculated adiabatic mixed temperature of all educts in the respective stage before the start of the reaction. Experience shows that the reaction takes place completely upwards of an adiabatic mixed temperature of approx. 740° C. On this basis, the person skilled in the art can easily define the number of stages required and the distribution of the $TiCl_4$ among these stages.

Surprisingly, the chloride process according to the present invention, with addition of $TiCl_4$ purely in liquid form, can be performed not only when using oxygen preheated to roughly 1,600° C., but also when using preheated oxygen having a temperature in the range from roughly 740° C. to 1,000° C. In the latter case, there is no need for additional oxygen heating with an auxiliary flame, e.g. with toluene. A further advantage of the second version is lower chlorine consumption, which otherwise occurs due to formation of HCl during toluene combustion.

The method according to the present invention can be performed under the conditions indicated in Examples 1 and 2, below, although this list is in no way intended to restrict the invention. The Reference Example is based on one-stage addition of gaseous $TiCl_4$ in accordance with the prior art (EP 0 427 878 B1):

|  | Example 1 | Example 2 | Reference |
|---|---|---|---|
| No. of stages | 2 | 5 | 1 |
| O2 temperature upstream of reaction zone (° C.) | 1,650 | 920 | 1,650 |
| Toluene demand (kg/h) | 110 | 0 | 110 |
| Cl consumption due to HCl formation (kg/h) | 340 | 0 | 340 |
| $TiCl_4$ (t/h) for 1st stage | 9.1 | 1.2 | 24.0 |
| 2nd stage | 14.9 | 2.9 | — |
| 3rd stage | — | 4.3 | — |
| 4th stage | — | 6.5 | — |
| 5th stage | — | 9.1 | — |

The method according to the invention offers several advantages compared to the addition of gaseous $TiCl_4$:

The energy and apparatus required for evaporating the $TiCl_4$ are eliminated.

Because of the high momentum of the injected liquid droplets, the $TiCl_4$ can be dispersed more efficiently when added in liquid form, this making it possible to create more homogeneous reaction conditions.

In the multi-stage method, mixing with relatively cold educt in the second and further combustion stages lowers the adiabatic reaction temperature, meaning that the sintering process, i.e. particle growth, is completed sooner. This reduces the content of coarse particles in the pigment.

Figure 1:
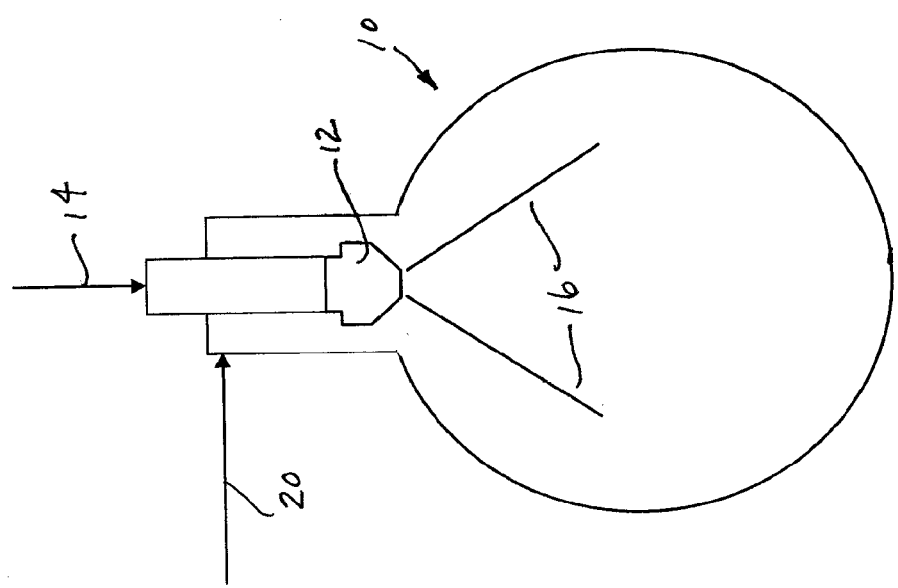
FIG. 1 is a diagrammatic illustration of a plug flow reactor having a single fluid nozzle, aligned parallel to a plane lying perpendicular to the center line of the reactor for use with the present method.

Referring simultaneously to FIGS. 1 and 2, a plug flow reactor for use with the present method is illustrated, and is generally identified by the numeral 10. Liquid $TiCl_4$ is introduced into plug flow reactor 10 through a nozzle such as, for example, single fluid nozzle 12, disposed around the circumference of reactor 10. Nozzle 12 receives liquid $TiCl_4$ at input 14 and creates a $TiCl_4$ spray 16 within reactor 10. Nozzle 12 atomizes the liquid $TiCl_4$ into small droplets which evaporate within reactor 10 without hitting the walls of reactor 10. FIG. 2 illustrates the directional flow of gas within reactor 10 shown by arrow 18.

Nozzle 12 is enveloped by a protective gas 20 introduced into reactor 10 in order to prevent any accumulation of solids and thermal damage to nozzle 12.

FIG. 1 illustrates nozzle 12 aligned parallel to a plane lying perpendicularly to the center line of reactor 10.

Referring simultaneously to FIGS. 3 and 4, the use of a nozzle 22 with reactor 10, for use with the present method is illustrated. Nozzle 22 includes a hollow cone cluster head nozzle for producing a TiCl4 spray 24 having smaller size droplets than the nozzle 12 produces.

Nozzles 12 and 22 are single fluid nozzles; however, the present invention can be utilized with a nozzle having two fluid paths (two-fluid nozzle) where a liquid and a gas, propellant, can be introduced at a single location along the circumference of reactor 10. A propellant may include, for example, one or a mixture, of the gases from the group comprising nitrogen, argon, chlorine gas and oxygen.

Referring to FIG. 5, the use of three nozzles 12 with reactor 10 is illustrated wherein the nozzles 12 are disposed radially to the circumference of reactor 10. Nozzles 12 are located to inject $TiCl_4$ into reactor 10 where the nozzles are aligned parallel to a plane lying perpendicular to the center line of reactor 10. $TiCl_4$ spray 26 is created within reactor 10.

Figure 6:
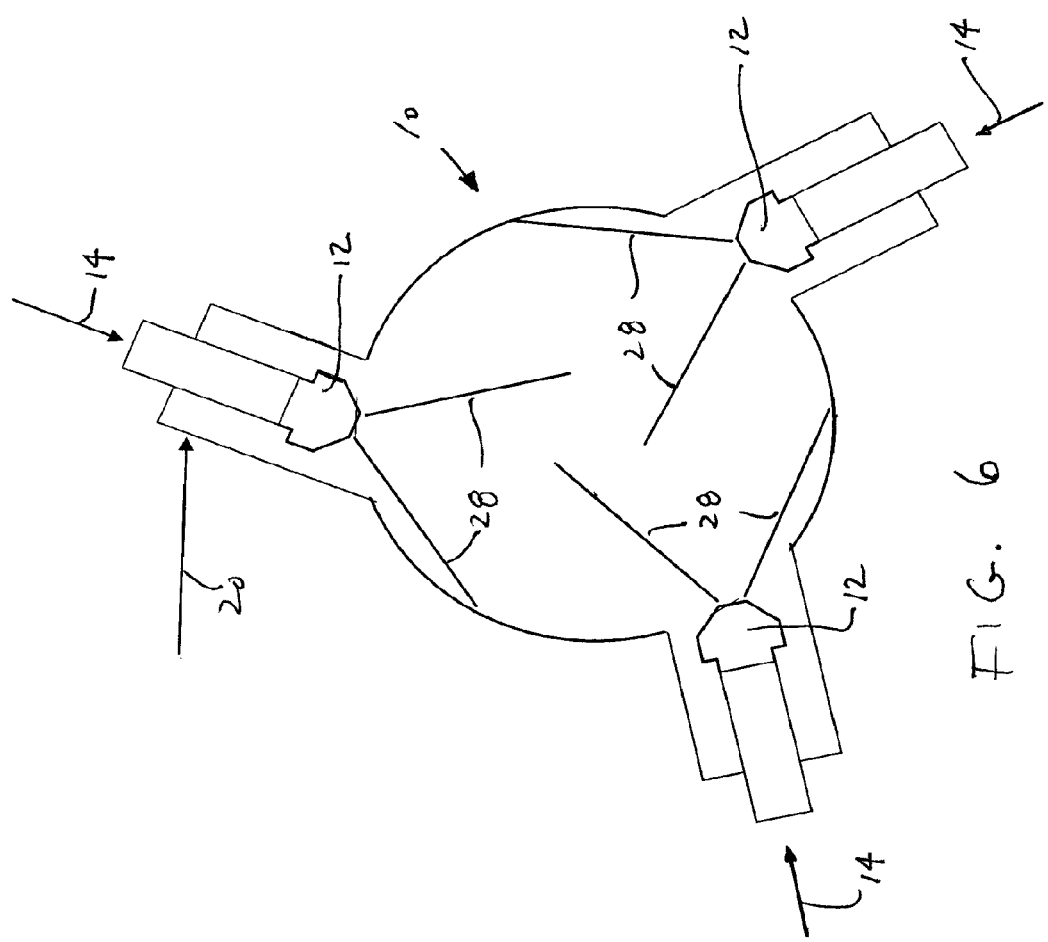
FIG. 6 is a diagrammatic illustrative of a plug flow reactor having three single fluid nozzles, aligned tangentially to the circumference of the reactor and parallel to a plane lying perpendicular to the center line of the reactor for use with the present method.

FIG. 6 illustrates the use of three nozzles 12 for injecting liquid $TiCl_4$ into reactor 10 wherein the nozzles are aligned tangentially to the circumference of the reactor and in a plane lying perpendicular to the center line reactor 10 in order for injection to set the flow in the reactor 10 in rotary motion. A $TiCl_4$ spray 28 is created within reactor 10. The orientation of nozzles 12 shown in FIG. 6 result in a better distribution in reactor 10 of the abrasive particles introduced into reactor 10 to clean the interior walls of reactor 10.

The practical examples described are merely possible embodiments of the present invention and not to be taken as restricting the invention. For example, the present invention optionally also comprises the addition, familiar to the person skilled in the art, of additives for rutilization (e.g. $AlCl_3$) and for nucleation (e.g. alkali salts) in the reaction zone.

Furthermore, the present invention comprises embodiments of the method characterized by multistage addition of oxygen.

What is claimed is:

1. A method for manufacturing titanium dioxide particles, comprising the steps of:
   providing titanium tetrachloride exclusively in liquid form;
   providing an oxygen-containing gas;
   reacting the liquid titanium tetrachloride with the oxygen containing gas via an oxidation reaction in a plug flow reactor;
   wherein the titanium tetrachloride is introduced into the reactor in at least a first and second stage; and wherein the titanium tetrachloride is divided among each of the stages so as to maintain an adiabatic mixed temperature in each stage of at least approximately 740° C.

2. The method of claim 1 wherein a quantity of titanium tetrachloride is added to the first stage and a larger quantity of titanium tetrachloride is added to the second stage.

3. The method of claim 1 wherein there is at least one subsequent stage after the second stage.

4. The method of claim 3 wherein a quantity of titanium tetrachloride is introduced into the reactor at the first stage and a larger quantity of titanium dioxide is introduced into the reactor at the second and at least one subsequent stages.

5. The method of claim 4 wherein differing amounts of titanium tetrachloride is introduced into the reactor at each of the stages.

6. The method of claim 1 wherein the oxidation reaction has an activation energy and the activation energy for the first stage is provided solely by the oxygen-containing gas and the liquid titanium tetrachloride.

7. The method of claim 6 wherein the activation energy in the second and any subsequent stages is provided solely by the oxygen-containing gas, the liquid titanium tetrachloride and the reaction enthalpy released in prior stages.

8. The method of claim 1 wherein the oxygen-containing gas is preheated to a temperature of up to about 1,600° C.

9. The method of claim 1 wherein the oxygen-containing gas is preheated to a temperature in the range from about 740° C. to about 1,000° C.

10. The method of claim 1 wherein the titanium tetrachloride is introduced into the reactor by single fluid nozzles.

11. The method of claim 10 wherein the single fluid nozzles include hollow cone cluster head nozzles.

12. The method of claim 10 wherein the nozzles are enveloped by a protective gas.

13. The method of claim 10 wherein the reactor has a center line and the nozzles are aligned parallel to a plane lying generally perpendicularly to the center line.

14. The method of claim 10 wherein the reactor has a center line and a circumference and the nozzles are aligned tangentially to the circumference and parallel to a plane lying generally perpendicular to the center line.

15. The method of claim 1 wherein the titanium tetrachloride is introduced into the reactor by two-fluid nozzles.

16. The method of claim 15 wherein the nozzles are enveloped by a protective gas.

17. The method of claim 15 wherein the reactor has a center line and the nozzles are aligned parallel to a plane lying generally perpendicularly to the center line.

18. The method of claim 15 wherein the reactor has a center line and a circumference and the nozzles are aligned tangentially to the circumference and parallel to a plane lying generally perpendicular to the center line.

19. The method of claim 15 and further including introducing a propellant through said two-fluid nozzles into the reactor, the propellant including a gas selected from the group consisting of nitrogen, argon, chlorine and a mixture thereof.

20. Titanium dioxide particles manufactured in accordance with the method of claim 1.

* * * * *